United States Patent [19]

Ghibaudo et al.

[11] 4,264,855
[45] Apr. 28, 1981

[54] ELECTRICAL POWER SUPPLY EQUIPMENT FOR MOTOR VEHICLES

[75] Inventors: Matteo Ghibaudo, Turin; Luigi Darbesio, Orbassano, both of Italy

[73] Assignee: Centro Ricerche Fiat S.p.A., Orbassano, Italy

[21] Appl. No.: 60,106

[22] Filed: Jul. 24, 1979

[30] Foreign Application Priority Data

Jul. 26, 1978 [IT] Italy .................. 68781 A/78

[51] Int. Cl.³ .................................. H02J 7/14
[52] U.S. Cl. .................................. 320/6; 320/15; 320/56; 307/10 R
[58] Field of Search .................. 320/2–5, 320/6, 7, 15, 16, 56; 307/149, 150, 10

[56] References Cited

U.S. PATENT DOCUMENTS

| | | | |
|---|---|---|---|
| 2,866,907 | 12/1958 | Gebhard | 320/15 X |
| 3,174,048 | 3/1965 | Snyder et al. | 320/56 X |
| 3,763,415 | 10/1973 | Ownby | 320/16 X |
| 3,949,289 | 4/1976 | Day | 320/15 X |
| 4,082,992 | 4/1978 | Day | 320/6 |

*Primary Examiner*—Robert J. Hickey
*Attorney, Agent, or Firm*—Sughrue, Rothwell, Mion, Zinn & Macpeak

[57] ABSTRACT

Electrical power supply equipment for motor vehicles has a main electrical system and an auxiliary electrical system, a main battery, an auxiliary battery and an electrical generator, driven by the vehicle engine, which can be connected selectively to either battery.

A supply device can be connected to an electrical mains supply for recharging the batteries while the main electrical system is connected to the supply device. When the vehicle is running the main and auxiliary electrical systems are connected to the generator, while when the vehicle is stationary the auxiliary system is connected to the supply device which, when disconnected from the mains supply, ensures connection of both systems to the batteries.

5 Claims, 1 Drawing Figure

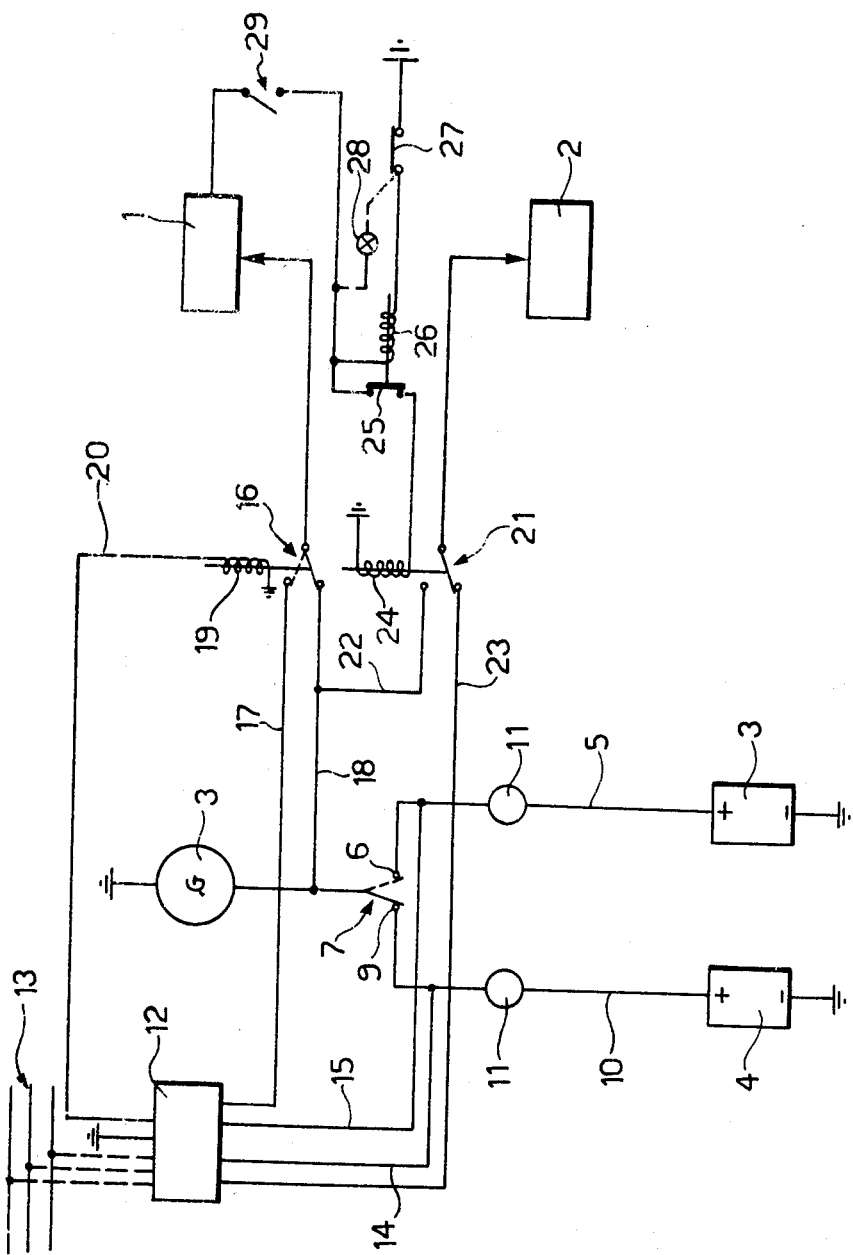

ELECTRICAL POWER SUPPLY EQUIPMENT FOR MOTOR VEHICLES

The present invention relates to electrical power supply equipment for motor vehicles, particularly 'camper' type motor vehicles, provided with a main electrical system and with an auxiliary electrical system for feeding auxiliary consumer equipment; more particularly the invention concerns electrical supply equipment of the above specified type comprising a main battery, an auxiliary battery, and an electrical generator driven by the engine of the motor vehicle.

The object of the present invention is to provide electrical power supply equipment of the above specified type which enables correct recharging of the main battery and of the auxiliary battery both when the vehicle is moving and when the vehicle is stationary, whilst always ensuring starting of the motor vehicle engine with one of the aforesaid batteries.

With the aforesaid object in view the present invention provides electrical power supply equipment for motor vehicles having a main electrical system and an auxiliary electrical system for supplying auxiliary consumer equipment, the equipment comprising a main battery, an auxiliary battery, and an electrical generator driven by the engine of the motor vehicle, characterised in that the equipment further comprises: a first two position switch adapted to connect the generator selectively to the main battery or to the auxiliary battery; a supply device for connection to an electrical mains supply, connected through a first line and a second line to the main battery and to the auxiliary battery respectively, a second two position switch having a first position which it occupies when the supply device is connected to a mains supply and in which it connects the main electrical system of the motor vehicle to the supply device through a third line, and having a second position in which it connects the main electrical system of the motor vehicle to the said generator, a third two position switch having a first position which it occupies whilst the motor vehicle is stationary and in which it connects the auxiliary electrical system of the motor vehicle to the supply device through a fourth line, and having a second position in which it connects the auxiliary electrical system of the motor vehicle to the said generator, and further characterised in that said supply device is adapted to connect the first line to the third line and the second line to the fourth line when the supply device is disconnected from the mains supply.

Preferably the second switch is a relay switch having an excitation coil which is connected to the supply device so as to effect displacement of the second switch into its first position when the supply device is connected to the mains supply.

The third switch also preferably comprises a relay switch controlled by an excitation coil which is connected to the main electrical system in such a manner as to effect displacement of the third switch into its second position when the lubricating oil pressure of the vehicle engine is below a predetermined threshold value. Preferably the excitation coil of the third switch is connected to the main electrical system through a normally closed relay switch having an excitation coil the energisation of which is controlled by a movable contact of a pressure switch which is closed when the engine lubricating oil pressure falls below the threshold value to cause energisation of said excitation coil and opening of said relay switch.

The invention will be further described, by way of non-limiting example, with reference to the accompanying drawing, which illustrates the circuit diagram of electrical power supply equipment according to one embodiment of the invention.

Reference numerals 1 and 2 indicate diagrammatically the main electrical system and the auxiliary electrical system respectively of a 'camper' type motor vehicle.

The vehicle carries a main battery 3 and an auxiliary battery 4. The main battery 3 is connected through a line 5 to a fixed contact 6 of a two position switch 7, the movable contact of which is connected to an electrical generator 8 driven by the engine (not shown) of the motor vehicle. The other fixed contact 9 of the two position switch 7 is connected through a line 10 to the auxiliary battery 4. The two position switch 7 therefore enables the generator 8 to be connected selectively to the main battery 3 and to the auxiliary battery 4. Both the line 5 and the line 10 include a respective ammeter 11 to indicate the current flowing in the respective lines 5 and 10.

Reference numeral 12 indicates a supply device which is adapted to be inserted in an electrical mains supply 13 and connected by lines 14 and 15 to the lines 10 and 5 respectively. A two-position relay switch 16 is adapted to connect selectively the main electrical system 1 of the motor vehicle through a line 17 which is connected to the supply device 12 or to a line 18 connected to the generator 8. The relay switch 16 has an excitation coil 19 which, when the supply device 12 is connected to the mains supply 13, is fed through a line 20 from the supply device 12 so as to effect movement of the relay switch 16 into the position in which it connects the main electrical system 1 to the line 17.

Another two-position relay switch 21 is adapted to connect selectively the auxiliary electrical system 2 of the motor vehicle to a line 22 branching from the line 18 or to a line 23 connected to the supply device 12. The relay switch 21 has an excitation coil 24 which is connected to the main electrical system 1 through a switch 29 operable by the ignition key of the motor vehicle and a normally closed relay switch 25. The relay switch 25 has an excitation coil 26 connected to the main electrical system 1 through a movable contact 27 of a pressure switch of known type (not shown) responsive to the lubricating oil pressure of the motor vehicle engine. When the engine oil pressure falls below a threshold value the contact 27 closes, completing a circuit for a warning lamp 28 on the dashboard of the vehicle and energising the coil 26 to open the relay switch 25, thereby de-energising the relay coil 24.

When the pressure of the engine lubricating oil exceeds the aforesaid threshold value the movable contact 27 opens, de-energising the coil 26 and causing energisation of the relay coil 24; consequently the switch 21 is moved to its position connecting the auxiliary electrical system 2 to the line 22.

The power supply device 12 is constructed as known in the art, so that, when the device 12 is disconnected from the mains supply 13 line 14 is connected to line 23 and line 15 is connected to line 17.

The working of the illustrated system will now be described with reference to the drawings.

As far as the recharging of the batteries 3 and 4 is concerned, the operation of the system differs according to whether the motor vehicle is moving or stationary. Whilst the vehicle is in motion the generator 8 recharges the battery which is connected to said generator 8 through the switch 7. A regulating device of known type may be used for the control of the state of charge of the batteries 3 and 4. Similarly the driver of the vehicle may operate the switch 7 in such a way as to connect the more discharged battery to the generator 8. This second remedy is preferred to the known method of connecting both the batteries to the generator 8 in parallel, a method which never in practice enables correct recharging of both of the batteries: the battery which has the greater charge has a lower internal resistance and therefore, contrary to the desired effect, charges before that which has the lower charge.

The switch 7 may be of a type well known in the art and may operate in such a way as to connect both the batteries 3 and 4 to the generator 8 for a brief interval every time the switch 7 is changed over from one of its positions to the other. This is done in order to avoid a dangerous overvoltage effect upon the changeover of the connection of the generator 8 to the batteries 3 and 4 when the engine is operating.

Whilst the motor vehicle is stationary it is possible to recharge the batteries 3 and 4 by connecting the supply device 12 to the mains supply 13. The supply device 12 then feeds the auxiliary battery 4 through the line 14 and the main battery 3 through the line 15, independently and simultaneously recharging both said batteries.

Moreover, with the motor vehicle stationary, in the event of the supply device 12 being disconnected from the mains supply 13 by de-energisation of the coil 19 the position of the relay switch 16 will be such as to connect the main electrical system 1 to the connection line 18. If under these conditions the ignition key switch 29 is open the coil 24 will be de-energised; alternatively, if the vehicle engine is running at idling speed the pressure of the engine lubricating oil would be below the aforesaid threshold value and the warning lamp 28 would be lit, the contact 27 of the pressure switch being closed. In this second case the relay coil 26 is energised, opening the relay switch 25 and de-energising the coil 24. Thus the switch 21 in both cases occupies the position in which it connects the auxiliary electrical system 2 to the line 23.

As stated earlier, when the supply device 12 is disconnected from the mains supply 13 it connects the line 14 to line 23, and the line 15 to the line 17. The main electrical system 1 is then fed by whichever of the two batteries 3 or 4 is connected through the switch 7 to the line 18, whilst the auxiliary electrical system 2 is fed through lines 23 and 14 from auxiliary battery 4. Under these conditions it is not possible for the main battery 3 to feed the auxiliary electrical system 2: this avoids the possibility of the main battery 3 discharging whilst still ensuring that the starter motor of the vehicle engine can be connected to said main battery. The main battery 3 may, however, still be connected to the main electrical system 1 of the motor vehicle by closing the switch 7 onto the fixed contact 6.

The supply of the electrical systems 1 and 2 is dependent upon whether the vehicle is stationary or in motion. Whilst the vehicle is stationary, the connection of the supply device 12 to the mains supply 13 causes energisation of the relay coil 19, through the supply device 12, displacing the relay switch 16 into the position in which the main electrical system 1 is connected to the line 17, the lines 14, 23 and 15, 17 being disconnected from each other. As already described, however, the switch 21 remains in its position connecting the auxiliary electrical system 2 to the line 23.

Under these conditions, therefore, the main electrical system 1 is fed through the line 17 by the supply device 12 connected to the mains supply 13, whilst the auxiliary electrical system 2 is fed through the line 23 by the same supply device 12. It will be seen that the two batteries 3 and 4 are not connected to the electrical systems 1 and 2 of the motor vehicle, but the supply device 12 enables the batteries 3 and 4 to be maintained at the correct charging levels through the lines 14 and 15.

Whilst the vehicle is in motion the excitation coil 19 is not energised and as a result the switch 16 is in the position in which it connects the main electrical system 1 to the line 18. When the engine lubricating oil pressure of the vehicle exceeds the aforesaid threshold value, the movable contact 27 of the pressure switch opens, and the warning lamp 28 is extinguished, de-energising the excitation coil 26 and causing the closure of the relay switch 25. This in turn causes energisation of the relay coil 24, moving the relay switch 21 into the position in which it connects the auxiliary electrical system 2 to the line 22.

Under these conditions the generator 8 always provides both for the recharging of the batteries 3 and 4 and, as has been seen, for the feeding, through the lines 18 and 22 respectively, of the main electrical system 1 and the auxiliary electrical system 2.

It will be appreciated that without altering the principle of the invention details of construction of practical embodiments may be widely varied from what has been described and illustrated by way of example, while remaining within the scope of the present invention.

We claim:

1. Electrical power supply equipment for a motor vehicle having a main electrical system and an auxiliary electrical system for supplying auxiliary consumer equipment, the equipment comprising a main battery, an auxiliary battery, and an electrical generator adapted to be driven by the engine of the motor vehicle, wherein the improvements comprise in combination:

a first two-position switch adapted to connect the generator selectively to the main battery and to the auxiliary battery;

a supply device for connection to an electrical mains supply;

a first line and a second line connecting said supply device to the main battery and to the auxiliary battery respectively;

a third and a fourth line connected to said supply device;

a second two-position switch having a first position which it occupies when the supply device is connected to a mains supply and in which it connects the main electrical system of the motor vehicle to the supply device through said third line, and having a second position in which it connects the main electrical system of the motor vehicle to the said generator;

a third two-position switch, having a first position which it occupies whilst the motor vehicle is stationary and in which it connects the auxiliary electrical system of the motor vehicle to the supply device through said fourth line, and having a second position in which it connects the auxiliary electrical system of the motor vehicle to the said generator;

and said supply device is adapted to connect the first line to the third line and the second line to the fourth line when the supply device is disconnected from the mains supply.

2. Electrical power supply equipment as in claim 1, wherein the second switch is a relay switch having an excitation coil which is connected to the supply device so as to effect displacement of the second switch into its first position when the supply device is connected to the mains supply.

3. Electrical power supply equipment as in claim 1 or claim 2, wherein the third switch is a relay switch controlled by an excitation coil which is connected to the main electrical system in such a manner as to effect displacement of the third switch into its second position when the lubricating oil pressure of the vehicle engine is below a predetermined threshold value.

4. Electrical power supply equipment as in claim 3, wherein the excitation coil of the third switch is connected to the main electrical system through a normally closed relay switch having an excitation coil the energisation of which is controlled by a movable contact of a pressure switch which is closed when the engine lubricating oil pressure falls below the threshold value to cause energisation of said excitation coil and opening of said relay switch.

5. Electrical power supply equipment according to claim 1, including respective ammeters through which each of the two batteries is connected to the first switch.

* * * * *